No. 678,406. Patented July 16, 1901.
G. LEDER.
COTTON PICKER.
(Application filed Feb. 12, 1901.)
(No Model.) 2 Sheets—Sheet 1.
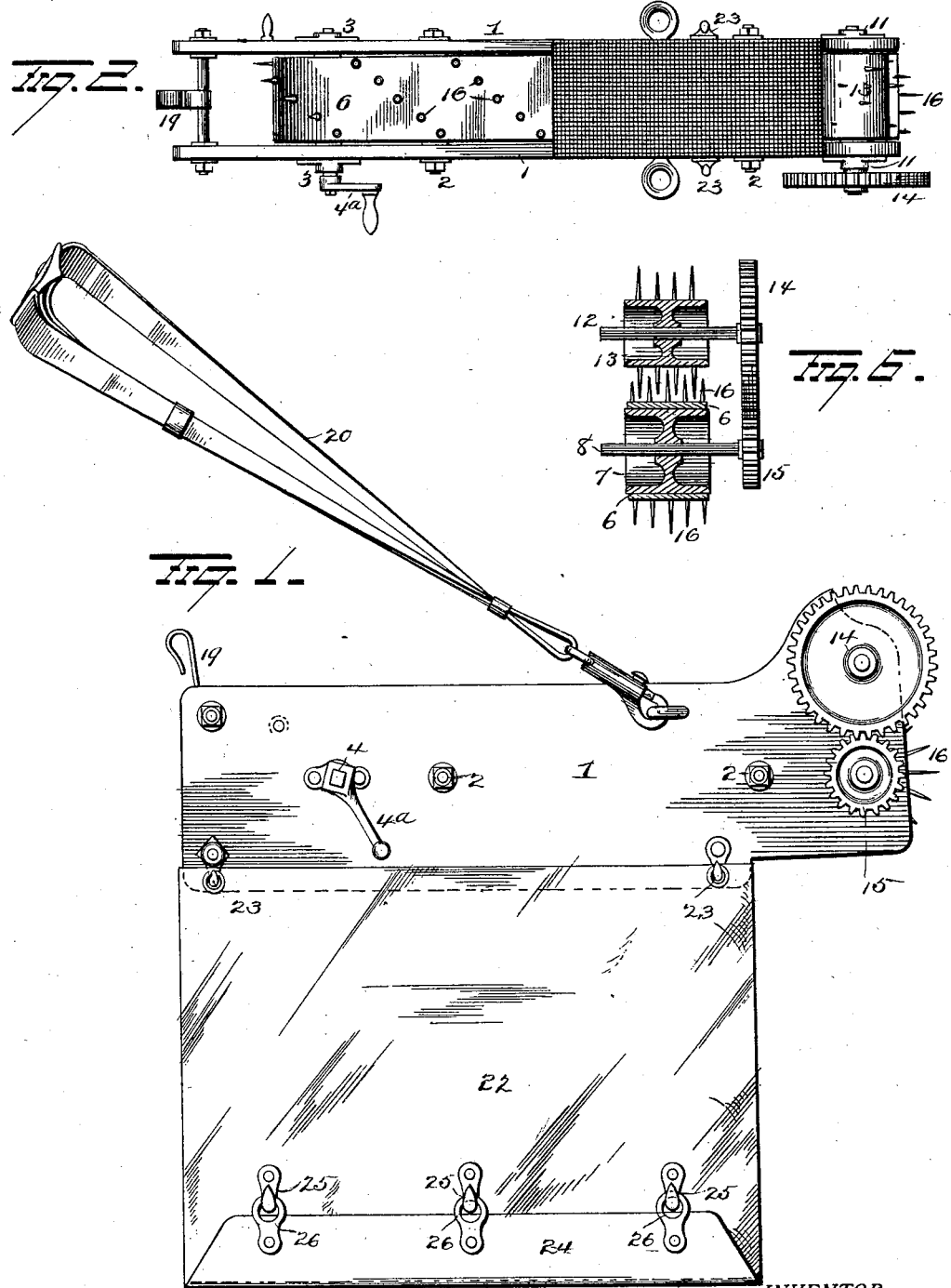

No. 678,406. Patented July 16, 1901.
G. LEDER.
COTTON PICKER.
(Application filed Feb. 12, 1901.)
(No Model.) 2 Sheets—Sheet 2.
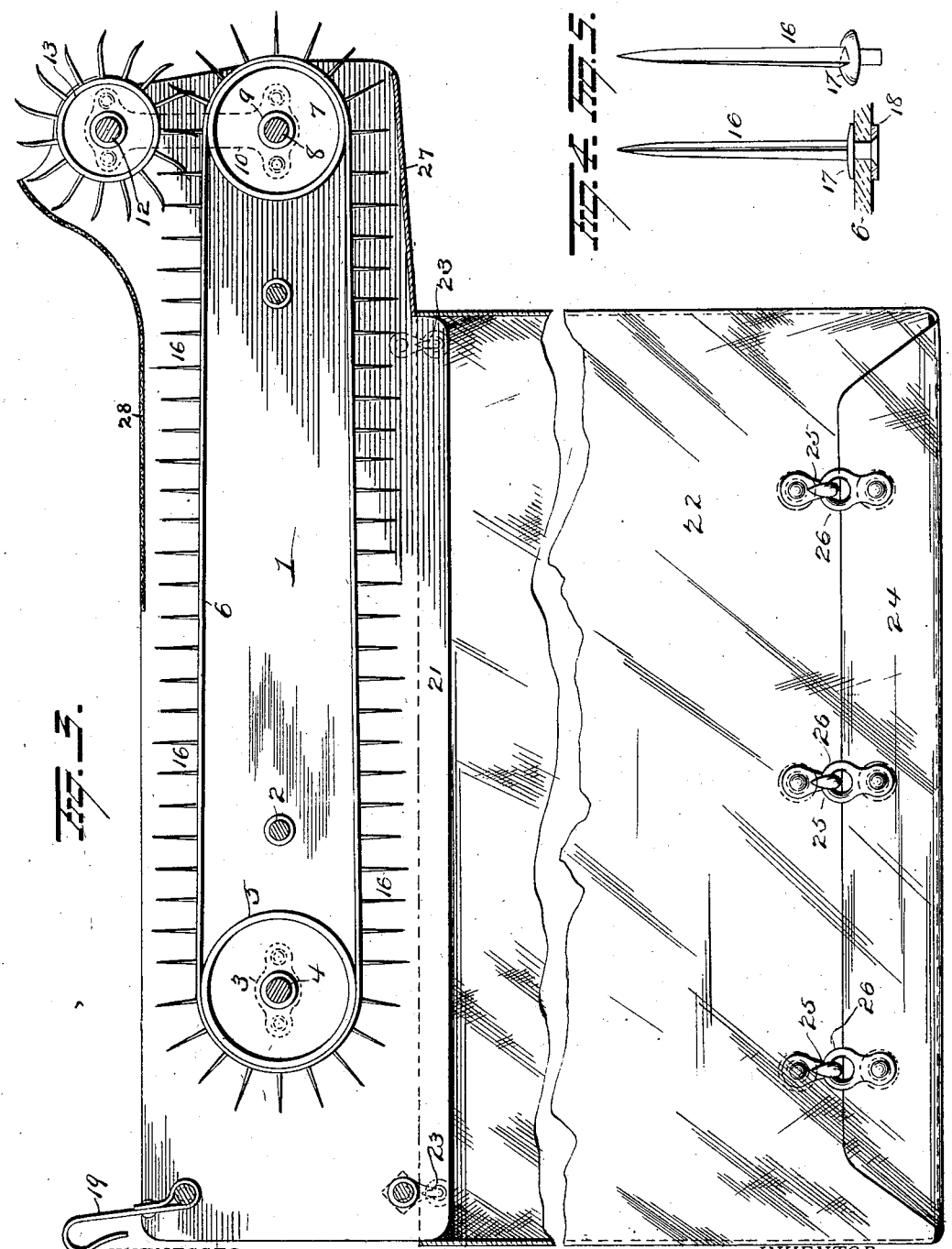
WITNESSES
E. S. Nottingham
G. F. Downing
INVENTOR
G. Leder
By H. A. Seymour
Attorney

UNITED STATES PATENT OFFICE.

GEORGE LEDER, OF DEMOPOLIS, ALABAMA.

COTTON-PICKER.

SPECIFICATION forming part of Letters Patent No. 678,406, dated July 16, 1901.

Application filed February 12, 1901. Serial No. 47,068. (No model.)

*To all whom it may concern:*

Be it known that I, GEORGE LEDER, of Demopolis, in the county of Marengo and State of Alabama, have invented certain new and useful Improvements in Cotton-Pickers; and I do hereby declare the following to be a full, clear, and exact description of the invention, such as will enable others skilled in the art to which it appertains to make and use the same.

My invention relates to an improved cotton-picker, the object of the invention being to provide a portable device which can be conveniently carried around by the operator and which will effectually remove the cotton from the bolls and deposit the same in a bag or sack connected to the picker.

With this object in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a top view. Fig. 3 is a view in section. Figs. 4 and 5 are enlarged detail views illustrating a tooth 16 and means for securing the same to the belt, and Fig. 6 is a detail view.

1 1 represent parallel plates, which may be of wood or metal, secured in position relative to each other and spaced apart by bolts 2 and having secured on their inner faces, near their rear ends, bearing-collars 3 for a shaft 4, projecting through one side plate 1 and provided on its end outside the plate with a suitable crank 4$^a$ for turning the same. A pulley 5 is secured on shaft 4 between the side plates 1 and is connected by an endless belt 6 with a pulley 7, secured on a shaft 8, mounted in bearing-collars 9 at the forward end of the side plates, and said collars 9 are preferably made integral with upright metal braces 10, secured to the side plates and provided at their upper ends with alined bearings 11 for a shaft 12, on which is secured a toothed pulley 13, a large gear 14 being secured on the shaft 12 and meshing with a smaller gear 15 on the shaft 8, so as to turn the toothed pulley at a slower rate of speed than the belt 6, for a purpose which will more fully hereinafter appear.

The belt 6 is provided with several diagonally-disposed series of pointed teeth 16, which latter are approximately triangular in cross-section and are disposed with a sharp straight cutting edge toward the line of movement of the belt. The teeth 16 are preferably provided near their lower ends with flanges 17 to rest on the belt and are forced through the belt and upset in washers 18 to secure them in position. The central line of teeth 16 on the belt are longer than the others, and the teeth on either side thereof gradually diminish in length, the shortest teeth being at the sides of the belt, and the central teeth of the pulley 13 are the shortest and gradually increase in length to the sides, and all of the teeth on the pulley are slightly bent at their free ends. The teeth are thus arranged because it is found that, owing to the shape of the open cotton-bolls, the central long teeth on the belt can better enter between the sections of the bolls and pull the cotton therefrom, the teeth on the pulley 13 serving to hold the bolls down in engagement with the teeth on the belt, and thereby assisting the same to draw in the cotton, and as the belt moves at a greater speed than the pulley the teeth on the former will keep the latter clean and remove any cotton which might entangle thereon.

A hook 19 is pivotally secured to the rear ends of the frame and adapted to be slipped over the belt of the operator to assist in supporting the picker, and a strap 20 is secured to the side plates 1 between their ends and is adapted to be placed around the neck of the operator to hold the picker in proper position.

The lower portion of the side plates 1 are made with tongues 21, over which a bag 22 to receive the cotton is slipped, and is secured in place by means of metal eyes riveted in the bag and slipped over pivoted hooks 23 on the side plates, and the lower end of the bag is closed by a flap 24, held closed by hooks 25 and eyes 26, but which will permit of the ready opening of the bag to empty the cotton when the bag is filled.

The lower section of the picker to the front of the tongue 21 is preferably closed by a plate 27, and a wire gauze or netting 28 is secured on the upper forward end of the picker to prevent the falling of trash therein, but permit the operator to watch the operation of the device.

The operation of my improvements is as follows: The picker is supported on the operator by means of the hook 19 and strap 20, as above described. The forward end of the picker is moved up to a cotton-boll and the crank 4ª turned, the teeth 16 on the belt 6 grasping the cotton and drawing it from the boll and conveying it back and dropping it into the bag 22, the toothed pulley 13 serving to hold the boll in engagement with the teeth on the belt and assisting the same to draw the cotton in. When the bag 22 is full, it can be quickly emptied by disengaging the hooks 25 from the eyes 26, when the flap 24 will fall and permit the cotton to escape and can be again closed and the operation of picking resumed with but slight loss of time.

While I have shown the toothed pulley 13 directly above the pulley 7, it is not necessary that it be exactly so placed, for it may be slightly in advance or in rear of pulley 7, and, in fact, might be below the same, when of course it would be necessary to turn the crank 4ª and belt 6 in the opposite direction, and instead of employing a belt I might employ a chain or chains mounted on sprocket-wheels.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A cotton-picker comprising a frame, an endless belt mounted longitudinally therein and having several series of fingers, means for supporting a bag under the major portion of said belt, a pulley mounted at the inlet end of the frame and having fingers arranged to intermesh with the fingers on the belt and means for operating said belt and pulley simultaneously in opposite directions.

2. A cotton-picker comprising a frame, a pulley in the outer end of said frame, a pulley in the frame near its inner end, a belt passing over said pulleys, several series of fingers projecting from said belt, the major portion of the bottom of the frame being open and provided with means for supporting a bag, a pulley mounted at the outer end of the frame, curved fingers projecting from said last-mentioned pulley and intermeshing with the fingers on the belt, means for driving the belt and gearing between one of the belt-pulleys and the pulley having the curved fingers.

3. In a cotton-picker, the combination with an elongated frame, an endless belt mounted longitudinally therein, fingers on the belt and means under the belt for supporting a bag, of a pulley near the outer end of the belt, curved fingers on said pulley to coöperate with the fingers on the belt, and operating means for the belt and pulley, said means constructed and adapted to drive said pulley at a slower rate of speed than that of the belt and to drive said pulley and belt in opposite directions.

4. In a cotton-picker, the combination with a frame, of an endless belt mounted therein and several series of fingers secured to said belt, the central finger of each series being of greater length than the other fingers of the series, substantially as and for the purpose set forth.

5. In a cotton-picker, the combination with a frame, of an endless belt therein and several series of fingers projecting from said belt, the fingers of each series being of varying lengths from the central finger to the lateral fingers.

6. In a cotton-picker, the combination with a frame, an endless belt mounted therein, and fingers projecting from said belt, of a pulley mounted at the outer end of the frame in proximity to the belt, and several sets of curved fingers projecting from said pulley, the lateral fingers of each set being of greater length than the central fingers.

7. In a cotton-picker, the combination with a frame, of an endless belt therein, a pulley mounted at the outer end of the frame in proximity to the belt, several series of fingers projecting from the belt, the central fingers having greater length than the lateral fingers, and several sets of curved fingers projecting from the pulley, the lateral curved fingers having greater length than the central curved fingers.

8. A portable cotton-picker comprising a frame, an endless belt mounted therein, fingers projecting from said belt, a pulley provided with fingers intermeshing with the fingers on the belt at the outer end of the frame, means for supporting a bag under the belt, a hook at the inner end of the frame to engage the belt of the operator, and straps attached to the forward portion of the frame for supporting the device on the body of the operator.

9. In a cotton-picker, the combination with two pulleys, a belt thereon and means for turning one of said pulleys, of several diagonally-disposed series of teeth secured on said belt, the central tooth of each series being longer than the others, a pulley revolubly supported above the forward belt-pulley and teeth on said pulley to move between the teeth on the belt.

In testimony whereof I have signed this specification in the presence of two subscribing witnesses.

GEORGE LEDER.

Witnesses:
  GEO. W. TAYLOR,
  S. W. FOSTER.